United States Patent
Natarajan et al.

(10) Patent No.: US 9,503,375 B1
(45) Date of Patent: Nov. 22, 2016

(54) METHODS FOR MANAGING TRAFFIC IN A MULTI-SERVICE ENVIRONMENT AND DEVICES THEREOF

(75) Inventors: Ravi Natarajan, Fremont, CA (US); Saxon Amdahl, Mountain View, CA (US)

(73) Assignee: F5 Networks, Inc., Seattle, WA (US)

( * ) Notice: Subject to any disclaimer, the term of this patent is extended or adjusted under 35 U.S.C. 154(b) by 234 days.

(21) Appl. No.: 13/173,943

(22) Filed: Jun. 30, 2011

Related U.S. Application Data (60) Provisional application No. 61/360,049, filed on Jun. 30, 2010.

(51) Int. Cl.
*H04L 12/56* (2006.01)
*G06F 11/00* (2006.01)
*H04L 12/801* (2013.01)

(52) U.S. Cl.
CPC ............... *H04L 47/10* (2013.01); *G06F 11/00* (2013.01)

(58) Field of Classification Search
None
See application file for complete search history.

(56) References Cited

U.S. PATENT DOCUMENTS

| | | |
|---|---|---|
| 5,282,201 A | 1/1994 | Frank et al. |
| 5,550,816 A | 8/1996 | Hardwick et al. |
| 5,606,665 A | 2/1997 | Yang et al. |
| 5,623,490 A | 4/1997 | Richter et al. |
| 5,991,302 A | 11/1999 | Berl et al. |
| 5,995,491 A | 11/1999 | Richter et al. |
| 6,026,500 A | 2/2000 | Topff et al. |
| 6,029,175 A | 2/2000 | Chow et al. |
| 6,041,365 A | 3/2000 | Kleinerman |
| 6,047,356 A | 4/2000 | Anderson et al. |
| 6,067,558 A | 5/2000 | Wendt et al. |
| 6,104,706 A | 8/2000 | Richter et al. |
| 6,154,777 A | 11/2000 | Ebrahim |
| 6,157,950 A | 12/2000 | Krishnan |

(Continued)

FOREIGN PATENT DOCUMENTS

| | | |
|---|---|---|
| CA | 2080530 A1 | 4/1994 |
| EP | 0605088 A3 | 7/1994 |

(Continued)

OTHER PUBLICATIONS

Baer, T., et al., "The Elements of Web Services" ADTmag.com, Dec. 1, 2002, pp. 1-6, (http://www.adtmag.com).

(Continued)

*Primary Examiner* — Steve Young
(74) *Attorney, Agent, or Firm* — LeClairRyan, a Professional Corporation (57) ABSTRACT

A method, computer readable medium, and device that manages traffic in a multi-service environment including determining a self score for a front virtual service which is coupled to one or more inner virtual services. An aggregate score for the front virtual service is determined based on an aggregate score for each of the one or more inner virtual services and a number of connections between each of the one or more inner virtual services and the front virtual service. An advertised score for the front virtual service for load balancing is obtained based on the determined self score and the determined aggregate score.

21 Claims, 4 Drawing Sheets

(56) References Cited

U.S. PATENT DOCUMENTS

| | | | |
|---|---|---|---|
| 6,259,405 B1 | 7/2001 | Stewart et al. | |
| 6,260,070 B1 | 7/2001 | Shah | |
| 6,292,832 B1 | 9/2001 | Shah et al. | |
| 6,304,913 B1 | 10/2001 | Rune | |
| 6,330,574 B1 | 12/2001 | Murashita | |
| 6,338,082 B1 | 1/2002 | Schneider | |
| 6,353,848 B1 | 3/2002 | Morris | |
| 6,363,056 B1 | 3/2002 | Beigi et al. | |
| 6,370,527 B1 | 4/2002 | Singhal | |
| 6,389,462 B1 | 5/2002 | Cohen et al. | |
| 6,446,108 B1 | 9/2002 | Rosenberg et al. | |
| 6,466,580 B1 | 10/2002 | Leung | |
| 6,469,983 B2 | 10/2002 | Narayana et al. | |
| 6,513,061 B1 | 1/2003 | Ebata et al. | |
| 6,514,085 B2 | 2/2003 | Slattery et al. | |
| 6,542,936 B1 | 4/2003 | Mayle et al. | |
| 6,560,230 B1 | 5/2003 | Li et al. | |
| 6,578,069 B1 | 6/2003 | Hopmann et al. | |
| 6,615,267 B1 | 9/2003 | Whalen et al. | |
| 6,631,422 B1 | 10/2003 | Althaus et al. | |
| 6,654,346 B1 | 11/2003 | Mahalingaiah et al. | |
| 6,701,415 B1 | 3/2004 | Hendren, III | |
| 6,708,220 B1 | 3/2004 | Olin | |
| 6,728,704 B2 | 4/2004 | Mao et al. | |
| 6,738,357 B1 | 5/2004 | Richter et al. | |
| 6,744,776 B1 | 6/2004 | Kalkunte et al. | |
| 6,754,215 B1 | 6/2004 | Arikawa et al. | |
| 6,754,699 B2 | 6/2004 | Swildens et al. | |
| 6,760,337 B1 | 7/2004 | Snyder, II et al. | |
| 6,795,860 B1 | 9/2004 | Shah | |
| 6,857,009 B1 | 2/2005 | Ferreria | |
| 6,862,282 B1 | 3/2005 | Oden | |
| 6,865,593 B1 | 3/2005 | Reshef et al. | |
| 6,868,447 B1 | 3/2005 | Slaughter et al. | |
| 6,871,221 B1 | 3/2005 | Styles | |
| 6,880,017 B1 | 4/2005 | Marce et al. | |
| 6,883,137 B1 | 4/2005 | Girardot et al. | |
| 6,904,040 B2 | 6/2005 | Salapura et al. | |
| 6,914,881 B1 | 7/2005 | Mansfield et al. | |
| 6,928,518 B2 | 8/2005 | Talagala | |
| 6,970,475 B1 | 11/2005 | Fraser et al. | |
| 6,970,924 B1 | 11/2005 | Chu et al. | |
| 6,973,490 B1 | 12/2005 | Robertson et al. | |
| 6,975,592 B1 | 12/2005 | Seddigh et al. | |
| 6,990,074 B2 | 1/2006 | Wan et al. | |
| 6,990,114 B1 | 1/2006 | Erimli et al. | |
| 7,003,564 B2 | 2/2006 | Greuel et al. | |
| 7,006,502 B2 | 2/2006 | Lin | |
| 7,020,713 B1 | 3/2006 | Shah et al. | |
| 7,023,974 B1 | 4/2006 | Brannam et al. | |
| 7,035,212 B1 | 4/2006 | Mittal et al. | |
| 7,039,061 B2 | 5/2006 | Connor et al. | |
| 7,065,482 B2 | 6/2006 | Shorey et al. | |
| 7,075,924 B2 | 7/2006 | Richter et al. | |
| 7,076,689 B2 | 7/2006 | Atkinson | |
| 7,080,314 B1 | 7/2006 | Garofalakis et al. | |
| 7,089,491 B2 | 8/2006 | Feinberg et al. | |
| 7,113,996 B2 | 9/2006 | Kronenberg | |
| 7,133,863 B2 | 11/2006 | Teng et al. | |
| 7,155,722 B1 * | 12/2006 | Hilla | G06F 9/505 709/223 |
| 7,161,904 B2 | 1/2007 | Hussain et al. | |
| 7,191,163 B2 | 3/2007 | Herrera et al. | |
| 7,228,359 B1 | 6/2007 | Monteiro | |
| 7,236,491 B2 | 6/2007 | Tsao et al. | |
| 7,240,100 B1 | 7/2007 | Wein et al. | |
| 7,257,633 B2 | 8/2007 | Masputra et al. | |
| 7,292,541 B1 | 11/2007 | C S | |
| 7,296,263 B1 | 11/2007 | Jacob | |
| 7,308,475 B1 * | 12/2007 | Pruitt et al. | 709/203 |
| 7,324,533 B1 | 1/2008 | DeLiberato et al. | |
| 7,340,571 B2 | 3/2008 | Saze | |
| 7,373,438 B1 | 5/2008 | DeBergalis et al. | |
| 7,409,440 B1 | 8/2008 | Jacob | |
| 7,555,608 B2 | 6/2009 | Naik et al. | |
| 7,577,723 B2 | 8/2009 | Matsuda et al. | |
| 7,640,347 B1 | 12/2009 | Sloat et al. | |
| 7,647,203 B1 * | 1/2010 | Herz | G06F 11/3428 702/182 |
| 7,675,868 B2 * | 3/2010 | Balonado | H04L 43/00 370/254 |
| 7,684,423 B2 | 3/2010 | Tripathi et al. | |
| 7,698,458 B1 | 4/2010 | Liu et al. | |
| 7,822,839 B1 | 10/2010 | Pruitt et al. | |
| 7,861,085 B1 | 12/2010 | Case et al. | |
| 7,885,398 B2 * | 2/2011 | Chandra | H04L 65/80 370/237 |
| 7,895,653 B2 | 2/2011 | Calo et al. | |
| 7,903,554 B1 * | 3/2011 | Manur et al. | 370/230.1 |
| 7,908,245 B2 | 3/2011 | Nakano et al. | |
| 7,958,222 B1 | 6/2011 | Pruitt et al. | |
| 7,984,500 B1 | 7/2011 | Khanna et al. | |
| 8,024,443 B1 | 9/2011 | Jacob | |
| 8,037,528 B2 | 10/2011 | Williams et al. | |
| 8,064,342 B2 | 11/2011 | Badger | |
| 8,069,225 B2 | 11/2011 | McCanne et al. | |
| 8,155,128 B2 | 4/2012 | Balyan et al. | |
| 8,171,124 B2 * | 5/2012 | Kondamuru | 709/223 |
| 8,190,769 B1 | 5/2012 | Shukla et al. | |
| 8,271,620 B2 | 9/2012 | Witchey | |
| 8,396,836 B1 | 3/2013 | Ferguson et al. | |
| 8,463,850 B1 | 6/2013 | McCann | |
| 8,484,348 B2 | 7/2013 | Subramanian et al. | |
| 8,560,693 B1 | 10/2013 | Wang et al. | |
| 8,601,000 B1 | 12/2013 | Stefani et al. | |
| 8,838,817 B1 | 9/2014 | Biswas | |
| 8,879,431 B2 | 11/2014 | Ridel et al. | |
| 8,959,215 B2 | 2/2015 | Koponen et al. | |
| 9,143,451 B2 | 9/2015 | Amdahl et al. | |
| 2001/0007560 A1 | 7/2001 | Masuda et al. | |
| 2002/0010757 A1 | 1/2002 | Granik et al. | |
| 2002/0012352 A1 | 1/2002 | Hansson et al. | |
| 2002/0038360 A1 | 3/2002 | Andrews et al. | |
| 2002/0065848 A1 | 5/2002 | Walker et al. | |
| 2002/0072048 A1 | 6/2002 | Slattery et al. | |
| 2002/0087571 A1 | 7/2002 | Stapel et al. | |
| 2002/0087744 A1 | 7/2002 | Kitchin | |
| 2002/0099829 A1 | 7/2002 | Richards et al. | |
| 2002/0099842 A1 | 7/2002 | Jennings et al. | |
| 2002/0103823 A1 | 8/2002 | Jackson et al. | |
| 2002/0143819 A1 | 10/2002 | Han et al. | |
| 2002/0143852 A1 | 10/2002 | Guo et al. | |
| 2002/0162118 A1 | 10/2002 | Levy et al. | |
| 2002/0174216 A1 | 11/2002 | Shorey et al. | |
| 2002/0194112 A1 | 12/2002 | dePinto et al. | |
| 2002/0194342 A1 | 12/2002 | Lu et al. | |
| 2002/0198956 A1 | 12/2002 | Dunshea et al. | |
| 2003/0005172 A1 | 1/2003 | Chessell | |
| 2003/0009528 A1 | 1/2003 | Sharif et al. | |
| 2003/0018450 A1 | 1/2003 | Carley | |
| 2003/0018585 A1 | 1/2003 | Butler et al. | |
| 2003/0034905 A1 | 2/2003 | Anton et al. | |
| 2003/0051045 A1 | 3/2003 | Connor | |
| 2003/0055723 A1 | 3/2003 | English | |
| 2003/0074301 A1 | 4/2003 | Solomon | |
| 2003/0105846 A1 | 6/2003 | Zhao et al. | |
| 2003/0108000 A1 | 6/2003 | Chaney et al. | |
| 2003/0108002 A1 | 6/2003 | Chaney et al. | |
| 2003/0128708 A1 | 7/2003 | Inoue et al. | |
| 2003/0130945 A1 | 7/2003 | Force et al. | |
| 2003/0139934 A1 | 7/2003 | Mandera | |
| 2003/0156586 A1 | 8/2003 | Lee et al. | |
| 2003/0179755 A1 | 9/2003 | Fraser | |
| 2003/0189936 A1 | 10/2003 | Terrell et al. | |
| 2003/0191812 A1 | 10/2003 | Agarwalla et al. | |
| 2003/0195813 A1 | 10/2003 | Pallister et al. | |
| 2003/0195962 A1 | 10/2003 | Kikuchi et al. | |
| 2003/0212954 A1 | 11/2003 | Patrudu | |
| 2003/0220835 A1 | 11/2003 | Barnes, Jr. | |
| 2003/0229665 A1 | 12/2003 | Ryman | |
| 2003/0236995 A1 | 12/2003 | Fretwell, Jr. | |
| 2004/0006591 A1 | 1/2004 | Matsui et al. | |
| 2004/0015783 A1 | 1/2004 | Lennon et al. | |
| 2004/0017825 A1 | 1/2004 | Stanwood et al. | |

(56) References Cited

U.S. PATENT DOCUMENTS

| | | |
|---|---|---|
| 2004/0030627 A1 | 2/2004 | Sedukhin |
| 2004/0030740 A1 | 2/2004 | Stelting |
| 2004/0043758 A1 | 3/2004 | Sorvari et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0093361 A1 | 5/2004 | Therrien et al. |
| 2004/0122926 A1 | 6/2004 | Moore et al. |
| 2004/0123277 A1 | 6/2004 | Schrader et al. |
| 2004/0133605 A1 | 7/2004 | Chang et al. |
| 2004/0138858 A1 | 7/2004 | Carley |
| 2004/0167967 A1 | 8/2004 | Bastian et al. |
| 2004/0177165 A1 | 9/2004 | Masputra et al. |
| 2004/0213156 A1 | 10/2004 | Smallwood et al. |
| 2004/0215665 A1 | 10/2004 | Edgar et al. |
| 2004/0236826 A1 | 11/2004 | Harville et al. |
| 2005/0008017 A1 | 1/2005 | Datta et al. |
| 2005/0021703 A1 | 1/2005 | Cherry et al. |
| 2005/0027841 A1 | 2/2005 | Rolfe |
| 2005/0044158 A1 | 2/2005 | Malik |
| 2005/0117589 A1 | 6/2005 | Douady et al. |
| 2005/0165656 A1 | 7/2005 | Frederick et al. |
| 2005/0174944 A1 | 8/2005 | Legault et al. |
| 2005/0175013 A1 | 8/2005 | Le Pennec et al. |
| 2005/0198234 A1 | 9/2005 | Leib et al. |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0256806 A1 | 11/2005 | Tien et al. |
| 2005/0273456 A1 | 12/2005 | Revanuru et al. |
| 2006/0031374 A1 | 2/2006 | Lu et al. |
| 2006/0031778 A1 | 2/2006 | Goodwin et al. |
| 2006/0045089 A1 | 3/2006 | Bacher et al. |
| 2006/0045096 A1 | 3/2006 | Farmer et al. |
| 2006/0047785 A1 | 3/2006 | Wang et al. |
| 2006/0100752 A1 | 5/2006 | Kim et al. |
| 2006/0112367 A1 | 5/2006 | Harris |
| 2006/0123210 A1 | 6/2006 | Pritchett et al. |
| 2006/0130133 A1 | 6/2006 | Andreev et al. |
| 2006/0133374 A1 | 6/2006 | Sekiguchi |
| 2006/0140193 A1 | 6/2006 | Kakani et al. |
| 2006/0153201 A1 | 7/2006 | Hepper et al. |
| 2006/0209669 A1 | 9/2006 | Nishio |
| 2006/0229861 A1 | 10/2006 | Tatsuoka et al. |
| 2006/0235998 A1 | 10/2006 | Stecher et al. |
| 2006/0259320 A1 | 11/2006 | LaSalle et al. |
| 2006/0268692 A1 | 11/2006 | Wright et al. |
| 2006/0270341 A1* | 11/2006 | Kim et al. ............ 455/16 |
| 2006/0282442 A1 | 12/2006 | Lennon et al. |
| 2007/0005807 A1 | 1/2007 | Wong |
| 2007/0016613 A1 | 1/2007 | Foresti et al. |
| 2007/0019636 A1 | 1/2007 | Lau et al. |
| 2007/0038994 A1 | 2/2007 | Davis et al. |
| 2007/0067771 A1 | 3/2007 | Kulbak et al. |
| 2007/0112775 A1 | 5/2007 | Ackerman |
| 2007/0124415 A1 | 5/2007 | Lev-Ran et al. |
| 2007/0124502 A1 | 5/2007 | Li |
| 2007/0130255 A1 | 6/2007 | Wolovitz et al. |
| 2007/0147246 A1 | 6/2007 | Hurley et al. |
| 2007/0162891 A1 | 7/2007 | Burner et al. |
| 2007/0168320 A1 | 7/2007 | Borthakur et al. |
| 2007/0168525 A1 | 7/2007 | DeLeon et al. |
| 2007/0192543 A1 | 8/2007 | Naik et al. |
| 2007/0233826 A1 | 10/2007 | Tindal et al. |
| 2007/0250560 A1 | 10/2007 | Wein et al. |
| 2008/0004022 A1 | 1/2008 | Johannesson et al. |
| 2008/0010372 A1 | 1/2008 | Khedouri et al. |
| 2008/0022059 A1 | 1/2008 | Zimmerer et al. |
| 2008/0120592 A1 | 5/2008 | Tanguay et al. |
| 2008/0141246 A1 | 6/2008 | Kuck et al. |
| 2008/0208917 A1 | 8/2008 | Smoot et al. |
| 2008/0263401 A1* | 10/2008 | Stenzel ............ 714/31 |
| 2008/0270578 A1 | 10/2008 | Zhang et al. |
| 2008/0281908 A1 | 11/2008 | McCanne et al. |
| 2008/0281944 A1 | 11/2008 | Vorne et al. |
| 2009/0080440 A1 | 3/2009 | Balyan et al. |
| 2009/0089487 A1 | 4/2009 | Kwon et al. |
| 2009/0094311 A1 | 4/2009 | Awadallah et al. |
| 2009/0097480 A1 | 4/2009 | Curtis et al. |
| 2009/0106413 A1 | 4/2009 | Salo et al. |
| 2009/0125955 A1 | 5/2009 | DeLorme |
| 2009/0138314 A1 | 5/2009 | Bruce |
| 2009/0161542 A1* | 6/2009 | Ho ............ 370/231 |
| 2009/0187915 A1* | 7/2009 | Chew et al. ............ 718/104 |
| 2009/0217163 A1 | 8/2009 | Jaroker |
| 2009/0217386 A1 | 8/2009 | Schneider |
| 2009/0241176 A1 | 9/2009 | Beletski et al. |
| 2009/0265396 A1 | 10/2009 | Ram et al. |
| 2009/0265467 A1 | 10/2009 | Peles |
| 2009/0289828 A1 | 11/2009 | Hinchey |
| 2009/0292957 A1 | 11/2009 | Bower et al. |
| 2009/0300161 A1 | 12/2009 | Pruitt et al. |
| 2009/0316708 A1 | 12/2009 | Yahyaoui et al. |
| 2009/0319600 A1 | 12/2009 | Sedan et al. |
| 2010/0042743 A1 | 2/2010 | Jeon et al. |
| 2010/0061232 A1* | 3/2010 | Zhou et al. ............ 370/230 |
| 2010/0064001 A1 | 3/2010 | Daily |
| 2010/0070476 A1 | 3/2010 | O'Keefe et al. |
| 2010/0093318 A1 | 4/2010 | Zhu et al. |
| 2010/0131654 A1 | 5/2010 | Malakapalli et al. |
| 2010/0179984 A1 | 7/2010 | Sebastian |
| 2010/0228814 A1 | 9/2010 | Mckenna et al. |
| 2010/0228819 A1 | 9/2010 | Wei |
| 2010/0242092 A1 | 9/2010 | Harris et al. |
| 2010/0250497 A1 | 9/2010 | Redlich et al. |
| 2010/0274772 A1 | 10/2010 | Samuels |
| 2010/0306169 A1 | 12/2010 | Pishevar et al. |
| 2010/0322089 A1* | 12/2010 | Raja et al. ............ 370/252 |
| 2011/0055921 A1 | 3/2011 | Narayanaswamy et al. |
| 2011/0066736 A1 | 3/2011 | Mitchell et al. |
| 2011/0072321 A1 | 3/2011 | Dhuse |
| 2011/0075667 A1 | 3/2011 | Li et al. |
| 2011/0078303 A1 | 3/2011 | Li et al. |
| 2011/0098087 A1 | 4/2011 | Tseng |
| 2011/0113095 A1 | 5/2011 | Hatami-Hanza |
| 2011/0185082 A1 | 7/2011 | Thompson |
| 2011/0188415 A1 | 8/2011 | Graziano |
| 2011/0213911 A1 | 9/2011 | Eidus et al. |
| 2012/0117028 A1 | 5/2012 | Gold et al. |
| 2012/0150805 A1 | 6/2012 | Pafumi et al. |
| 2012/0195273 A1 | 8/2012 | Iwamura et al. |
| 2012/0254293 A1 | 10/2012 | Winter et al. |
| 2012/0257506 A1 | 10/2012 | Bazlamacci et al. |
| 2012/0258766 A1 | 10/2012 | Cho et al. |
| 2013/0058229 A1 | 3/2013 | Casado et al. |
| 2013/0182713 A1 | 7/2013 | Giacomoni et al. |
| 2013/0238472 A1 | 9/2013 | Fan et al. |
| 2014/0071895 A1 | 3/2014 | Bane et al. |
| 2014/0099945 A1 | 4/2014 | Singh et al. |
| 2014/0105069 A1 | 4/2014 | Potnuru |
| 2014/0187199 A1 | 7/2014 | Yan et al. |
| 2014/0286316 A1 | 9/2014 | Park et al. |
| 2015/0058595 A1 | 2/2015 | Gura et al. |

FOREIGN PATENT DOCUMENTS

| | | |
|---|---|---|
| EP | 1081918 A2 | 3/2001 |
| JP | 06-205006 | 7/1994 |
| JP | 8021924 B | 3/1996 |
| JP | 2000183935 | 6/2000 |
| WO | 00/58870 A2 | 10/2000 |
| WO | 02/39696 A2 | 5/2002 |
| WO | 20061091040 A1 | 8/2006 |

OTHER PUBLICATIONS

Blue Coat, "Technology Primer: CIFS Protocol Optimization," Blue Coat Systems Inc., pp. 1-3, (http://www.bluecoat.com).

"Diameter MBLB Support Phase 2: Generic Message Based Load Balancing (GMBLB)", last accessed Mar. 29, 2010, pp. 1-10, (http://peterpan.f5net.com/twiki/bin/view/TMOS/TMOSDiameterMBLB).

(56) References Cited

OTHER PUBLICATIONS

F5 Networks Inc., "Big-IP® Reference Guide, version 4.5", F5 Networks Inc., Sep. 2002, pp. 11-1-1-32, Seattle, Washington.
F5 Networks Inc., "3-DNS® Reference Guide, version 4.5", F5 Networks Inc., Sep. 2002, pp. 2-1-2-28, 3-1-3-12, 5-1-5-24, Seattle, Washington.
F5 Networks Inc., "Using F5's-DNS Controller to Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).
F5 Networks Inc., "Deploying the Big-IP LTM for Diameter Load Balancing," F5® Deployment Guide, Version 2.0, pp. 1-19.
F5 Networks Inc., "F5 Diameter RM", Powerpoint document, Jul. 16, 2009, pp. 1-7.
F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5producs/3dns/relatedMaterials/UsingF5.html).
F5 Networks Inc., "Case Information Log for 'Issues with BoNY upgrade to 4.3'", as early as Feb. 2008.
F5 Networks Inc., "F5 WANJet CIFS Acceleration", White Paper, F5 Networks Inc., Mar. 2006, pp. 1-5, Seattle, Washington.
Fajardo V., "Open Diameter Software Architecture," Jun. 25, 2004, last accessed Sep. 2, 2008, pp. 1-6, Version 1.0.7, (http://diameter.sourceforge.net/diameter-architecture/indext.html).
Gupta et al., "Algorithms for packet classification", Dept. of Comput. Scie., Stanford Univ., CA, Mar./Apr. 2001, pp. 1, vol. 15, Issue 2, abstract only, last accessed May 14, 2007 (http://ieeexplore.ieee.org/xpl/freeabs_all.jsp?arnumber=912717&isnumber=19697).
Heinz G., "Priorities in Stream Transmission Control Protocol (SCTP) Multistreaming", Thesis submitted to the Faculty of the University of Delaware, Spring 2003, pp. 1-35.
Ilvesjmaki M., et al., "On the capabilities of application level traffic measurements to differentiate and classify Internet traffic", Presented in SPIE's International Symposium ITcom, Aug. 19-21, 2001, pp. 1-11, Denver, Colorado.
Internet Protocol, "Darpa Internet Program Protocol Specification", (RFC:791), Information Sciences Institute, University of Southern California, Sep. 1981, pp. 1-49.
Kawamoto, D., "Amazon files for Web services patent", CNET News.com, Jul. 28, 2005, pp. 1-2, last accessed May 4, 2006, (http://news.com).
LaMonica M., "Infravio spiffs up Web services registry idea", CNET News.com, May 11, 2004, pp. 1-2, last accessed Sep. 20, 2004, (http://www.news.com).
Mac Vittie, L., "Message-Based Load Balancing: Using F5 solutions to address the challenges of scaling Diameter, RADIUS, and message-oriented protocols", F5 Technical Brief, 2005, pp. 1-9, F5 Networks Inc., Seattle, Washington.
"Market Research & Releases, CMPP PoC documentation", last accessed Mar. 29, 2010, (http://mainstreet/sites/PD/Teams/ProdMgmt/MarketResearch/Universal).
"Market Research & Releases, Solstice Diameter Requirements", last accessed Mar. 29, 2010, (http://mainstreet/sites/PD/Teams/ProdMgmt/MarketResearch/Unisversal).
Modiano E., "Scheduling algorithms for message transmission over a satellitebroadcast system", MILCOM 97 Proceedings Lincoln Lab., MIT, Nov. 2-5, 1997, abstract only, last accessed Sep. 12, 2008, (http://ieeexplore,ieee.org/xpl/freeabs)all.jsp?arnumber=646697).
Nichols K., et al., "Definition of the Differentiated Services Field (DS Field) in the IPv4 and IPv6 Headers", (RFC:2474) Network Working Group, Dec. 1998, pp. 1-19, last accessed Oct. 8, 2012, (http://www.ietf.org/rfc/rfc2474.txt).
Ott D., et al., "A Mechanism for TCP-Friendly Transport-level Protocol Coordination", USENIX Annual Technical Conference, 2002, University of North Carolina at Chapel Hill, pp. 1-12.
Padmanabhan V., et al., "Using Predictive Prefetching to Improve World Wide Web Latency", SIGCOM, 1996, pp. 1-15.
"Respond to server depending on TCP::client_port", DevCentral Forums iRules, pp. 1-6, last accessed Mar. 26, 2010, (http://devcentral.f5.com/Default/aspx?tabid=53&forumid=5&tpage=1&v).
Rosen E, et al., "MPLS Label Stack Encoding", (RFC:3032) Network Working Group, Jan. 2001, pp. 1-22, last accessed Oct. 8, 2012, (http://www.ietf.org/rfc/rfc3032.txt).
Schilit B., "Bootstrapping Location-Enhanced Web Services", University of Washington, Dec. 4, 2003, (http://www.cs.washington.edu/news/colloq.info.html).
Seeley R., "Can Infravio technology revive UDDI?", ADTmag.com, Oct. 22, 2003, last accessed Sep. 30, 2004, (http://www.adtmag.com).
Shohoud, Y., "Building XML Web Services with VB .NET and VB 6", Addison Wesley, 2002, pp. 1-14.
Sommers F., "Whats New in UDDI 3.0—Part 1", Web Services Papers, Jan. 27, 2003, pp. 1-4, last accessed Mar. 31, 2004, (http://www.webservices.org/index.php/article/articleprint/871/-1/24/).
Sommers F., "Whats New in UDDI 3.0—Part 2", Web Services Papers, Mar. 2, 2003, pp. 1-8, last accessed Nov. 1, 2007, (http://www.web.archive.org/web/200406201310061).
Sommers F., "Whats New in UDDI 3.0—Part 3", Web Services Papers, Sep. 2, 2003, pp. 1-4, last accessed Mar. 31, 2007, (http://www.webservices.org/index.php/article/articleprint/894/-1/24/).
Sleeper B., "The Evolution of UDDI: UDDI.org White Paper", The Stencil Group, Inc., Jul. 19, 2002, pp. 1-15, San Francisco, California.
Sleeper B., "Why UDDI Will Succeed, Quietly: Two Factors Push Web Services Forward", The Stencil Group, Inc., Apr. 2001, pp. 1-7, San Francisco, California.
"UDDI Overview", Sep. 6, 2000, pp. 1-21, uddi.org, (http://www.uddi.org/).
"UDDI Version 3.0.1 UDDI Spec Technical Committee Specification", Oct. 14, 2003, pp. 1-383, uddi.org, (http://www.uddi.org/).
"UDDI Technical White Paper," Sep. 6, 2000, pp. 1-12, uddi-org, (http://www.uddi.org/).
Wang B., "Priority and realtime data transfer over the best-effort Internet", Dissertation Abstract, 2005, ScholarWorks@UMASS.
Wikipedia, "Diameter (protocol)", pp. 1-11, last accessed Oct. 27, 2010, (http://en.wikipedia.org/wiki/Diameter_(protocol)).
Woo T.Y.C., "A modular approach to packet classification: algorithms and results", Nineteenth Annual Conference of the IEEE Computer and Communications Societies 3(3):1213-22, Mar. 26-30, 2000, abstract only, last accessed May 14, 2007, (http://ieeexplore.ieee.org/xpl/freeabs_all.jsp?arnumber=832499).

\* cited by examiner

| VIRTUAL SERVICE NAME | SERVICE COMPONENT OR INTERNAL VIRTUAL SERVICE | SERVICE SELF SCORE |
|---|---|---|
| INTERNAL VIRTUAL SERVER 1 (IVS1) | APM1 | 15 |
| INTERNAL VIRTUAL SERVER 1 (IVS1) | WAM1 | 20 |
| INTERNAL VIRTUAL SERVER 1 (IVS1) | LAYERING iRULE | 25 |
| INTERNAL VIRTUAL SERVER 2 (IVS2) | APM2 | 10 |
| INTERNAL VIRTUAL SERVER 2 (IVS2) | WAM2 | 5 |
| INTERNAL VIRTUAL SERVER 2 (IVS2) | COMPRESSION CARD | 15 |
| FRONT VIRTUAL SERVER 1 (FVS1) | INTERNAL VIRTUAL SERVER 1 (IVS1) | 15 |
| FRONT VIRTUAL SERVER 1 (FVS1) | INTERNAL VIRTUAL SERVER 2 (IVS2) | 5 |

*FIG. 4*

| SERVICE NAME | TIME STAMP | SELF SCORE | AGGREGATE SCORE | ADVERTISED SCORE |
|---|---|---|---|---|
| FRONT VIRTUAL SERVER 1 (FVS1) | 9:00AM 06.20.2011 | 5 | 20 | 5 |
| INTERNAL VIRTUAL SERVER 1 (IVS1) | 10:30AM 06.18.2011 | 15 | 20.625 | 15 |
| INTERNAL VIRTUAL SERVER 2 (FVS2) | 10:00AM 06.19.2011 | 5 | 11.67 | 5 |

*FIG. 5*

METHODS FOR MANAGING TRAFFIC IN A MULTI-SERVICE ENVIRONMENT AND DEVICES THEREOF

This application claims priority from U.S. Provisional Application No. 61/360,049, filed Jun. 30, 2010 and hereby incorporates by reference the entirety of that application.

FIELD

This technology generally relates to methods and devices for traffic management and, more particularly, to methods for managing traffic balancing in a multi-service environment and devices thereof.

BACKGROUND

When making load balancing decisions, a traffic management device will determine a global traffic management or capacity score (gtm_score) for the system. Currently, this capacity score is determined by selecting a minimum score among all modules (APM, WOM, WAM and ASM) configured in a virtual service in the device.

Unfortunately, this calculated capacity score only represents the services used by a front virtual service in the device and does not consider any inner virtual services used behind the front virtual service. When the front virtual service uses other inner virtual services, this calculated capacity score is not an accurate representation of capacity resulting in ineffective load balancing.

SUMMARY

A method for managing traffic in a multi-service environment including determining with a traffic management device a self score for a front virtual service which is coupled to one or more inner virtual services. An aggregate score for the front virtual service is determined with the traffic management device based on an aggregate score for each of the one or more inner virtual services and a number of connections between each of the one or more inner virtual services and the front virtual service. An advertised score for the front virtual service for load balancing is obtained with the traffic management device based on the determined self score and the determined aggregate score.

A computer readable medium having stored thereon instructions for managing traffic in a multi-service environment comprising machine executable code which when executed by at least one processor, causes the processor to perform steps including determining a self score for a front virtual service which is coupled to one or more inner virtual services. An aggregate score for the front virtual service is determined based on an aggregate score for each of the one or more inner virtual services and a number of connections between each of the one or more inner virtual services and the front virtual service. An advertised score for the front virtual service for load balancing is obtained based on the determined self score and the determined aggregate score.

A traffic management device includes a memory coupled to one or more processors configured to execute programmed instructions stored in the memory including determining a self score for a front virtual service which is coupled to one or more inner virtual services. An aggregate score for the front virtual service is determined based on an aggregate score for each of the one or more inner virtual services and a number of connections between each of the one or more inner virtual services and the front virtual service. An advertised score for the front virtual service for load balancing is obtained based on the determined self score and the determined aggregate score.

This technology provides a number of advantages including providing more effective methods, computer readable medium and devices for managing traffic when multiple services are being provided. With this technology, a score representative of a current load on a system with multiple layered virtual systems can be determined and provided for load balancing decisions.

DETAILED DESCRIPTION

Figure 1:
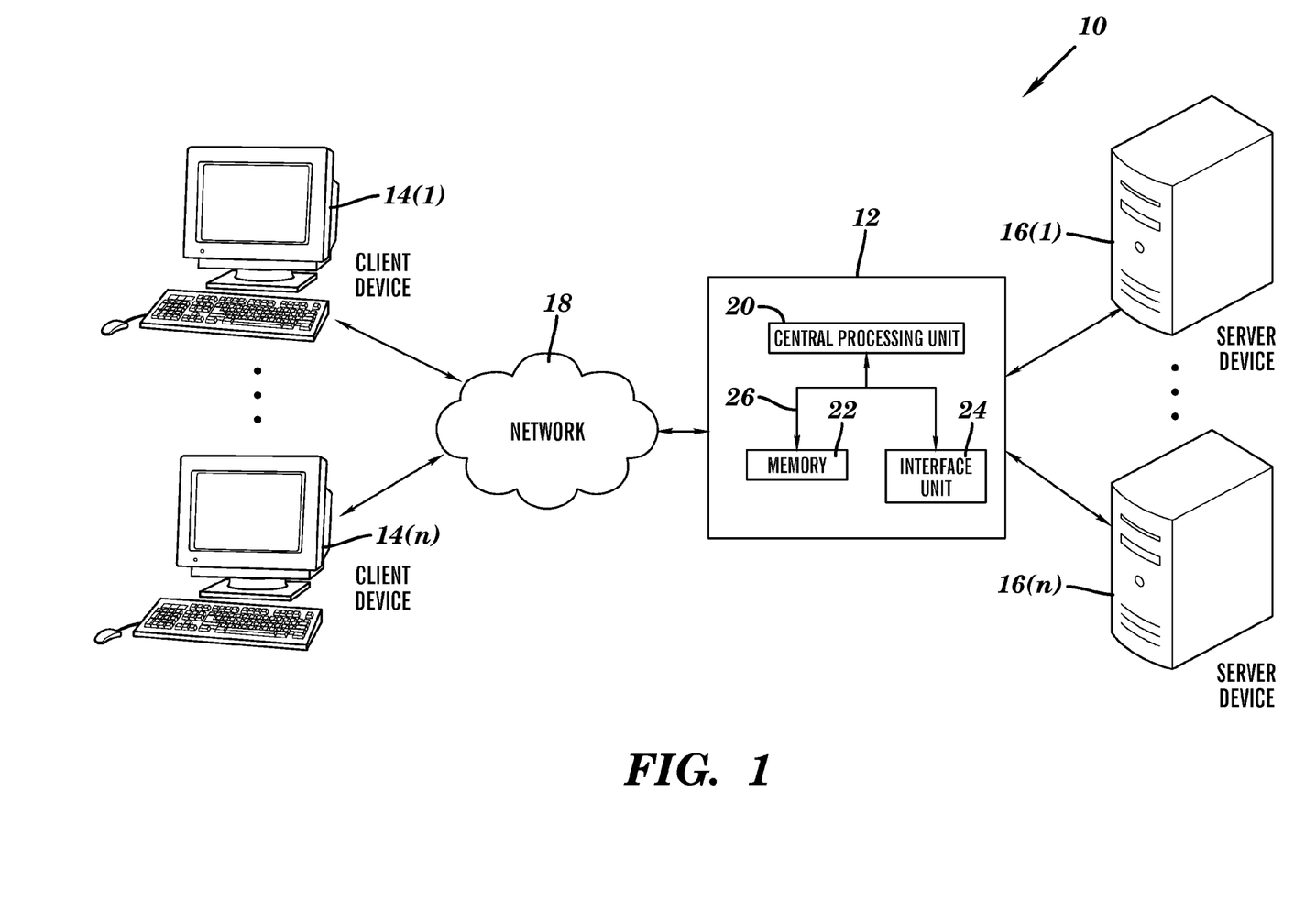
FIG. 1 is an exemplary block diagram of a network environment with an exemplary traffic management device.
Figure 2:
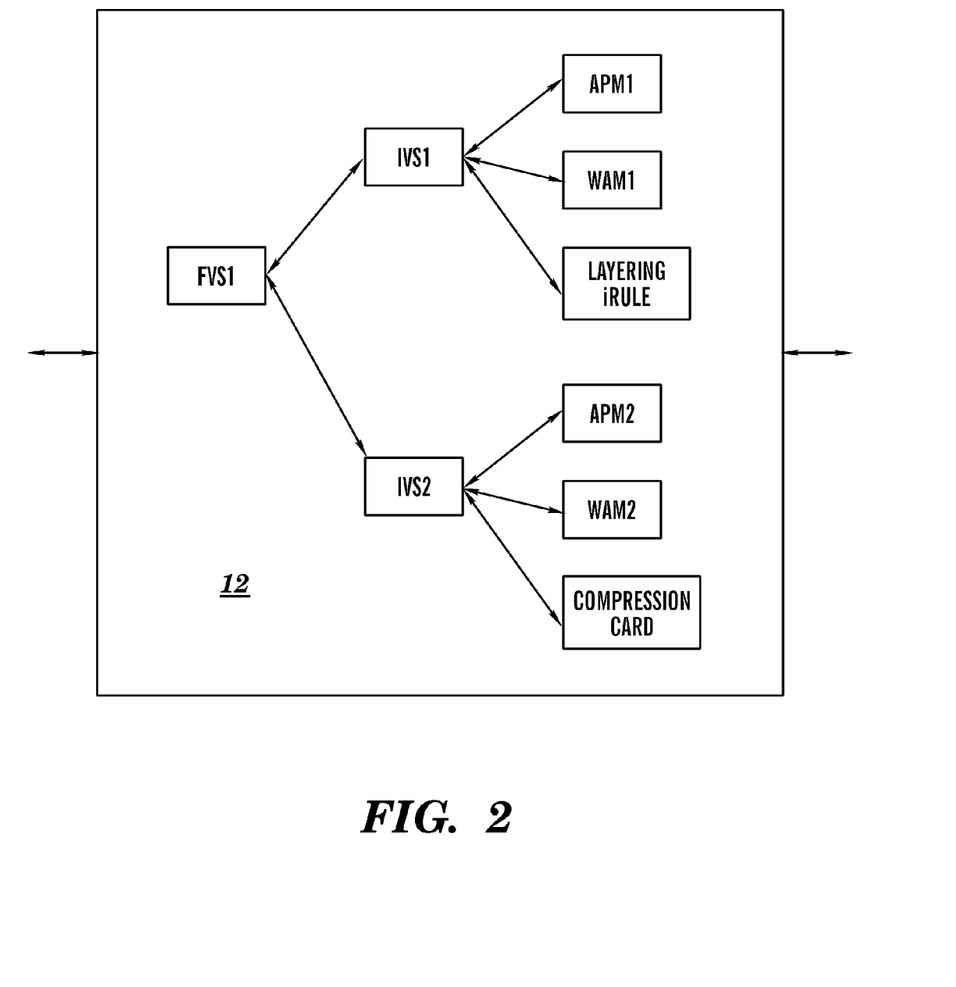
FIG. 2 is a functional block diagram of the exemplary traffic management device with multiple virtual services.

A network environment 10 with an exemplary traffic management device 12 for managing traffic when multiple services are being provided is illustrated in FIGS. 1 and 2. The exemplary network environment 10 includes the traffic management device 12, client computing devices 14(1)-14(n), server devices 16(1)-16(n), and a communication network 18, although the environment could include other types and numbers of systems, devices, blades, components, elements, and communication networks in other configurations. This technology provides a number of advantages including providing more effective methods, computer readable medium and devices for managing traffic when multiple services are being provided. With this technology a score representative of a current load on a system with multiple layered virtual systems can be determined and provided for load balancing decisions.

Referring more specifically to FIGS. 1 and 2, the traffic management device 12 includes at least one central processing unit (CPU) or processor 20, at least one memory 22, and an interface unit 24 which are coupled together by a bus 26 or other numbers and types of links, although the traffic management device could comprise other numbers and types of systems, devices, blades, components and elements in other configurations could be used. The network traffic management device 12 can implement multiple numbers and layers of virtual services.

The central processing unit (CPU) or processor 20 executes a program of stored instructions for one or more aspects of the technology as described herein. The memory 22 stores these programmed instructions for one or more aspects of the technology as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 20, can be used for the memory 22. The interface unit 24 is used to operatively couple data communications between one or more of the client computing devices 14(1)-14(n) and one or more of the server devices 16(1)-16(n), although other types and numbers of systems, devices, blades, components, and elements could be coupled together, such as one or more storage devices.

Each of the client computing devices 14(1)-14(n) and server devices 16(1)-16(n) include a central processing unit (CPU) or processor, a memory, and an interface or I/O system, which are coupled together by a bus or other link, although other numbers and types of network devices could be used. The client computing devices 14(1)-14(n), in this example, may run interface applications, such as Web browsers, that may provide an interface to make requests for and send data to server devices 16(1)-16(n). Generally, server devices 16(1)-16(n) process requests received from requesting client computing devices 14(1)-14(n). A series of applications may run on the server devices 16(1)-16(n) that allow the transmission of data, such as a data file or metadata, requested by the client computing devices 14(1)-14(n). The server devices 16(1)-16(n) may provide data or receive data in response to requests directed toward the respective applications on the server devices 16(1)-16(n) from the client computing devices 14(1)-14(n). Although server devices 16(1)-16(n) are shown, one or more of the server devices 16(1)-16(n) may be implemented as one or more software modules or other sets of programmed instructions and other types and numbers of devices could be coupled to the traffic management device 12.

The communication network 18 is a communication network which uses TCP/IP over Ethernet and industry-standard protocols, including SOAP, XML, LDAP, and SNMP, although other types and numbers of communication networks, such as a direct connection, a local area network, a wide area network, modems and phone lines, e-mail, and wireless communication technology, each having their own communications protocols, can be used.

Although an exemplary environment with the traffic management device 12, the client computing devices 14(1)-14(n), the server devices 16(1)-16(n), and the communication network 18 are described and illustrated herein, other types and numbers of systems, devices, blades, components, elements and communication networks in other configurations can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any example. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The examples may also be embodied as a computer readable medium having instructions stored thereon for one or more aspects of the technology as described and illustrated by way of the examples herein, which when executed by a processor, cause the processor to carry out the steps necessary to implement the methods of the examples, as described and illustrated herein.

An exemplary method for managing traffic in a multi-service environment when multiple services are being provided will now be described below with reference to FIGS. 1-5. Referring more specifically to FIG. 2, in this particular example the network traffic management device 12 has a front virtual service (FVS1) coupled to two inner virtual services 1 and 2 (IVS1 and IVS2) with forty connections (C1) between FSV1 and IVS1 and sixty connections (C2) between FSV1 and (IVS2), although other types and numbers of virtual services with other numbers of connections could be implemented. Additionally, in this particular example, inner virtual service 1 (IVS1) is coupled to three service components or modules (APM1, WAM1, and a layering iRule) by fifteen, five, and twenty connections (C3, C4, and C5) respectively, and inner virtual service 2 (IVS2) is coupled to three service components (APM2, WAM2, and compression card) by twenty, ten, and thirty connections (C6, C7, and C8) respectively, although other types, numbers, and layers of virtual services and service components with other numbers of connections can be utilized.

The service components are illustrated by way of example only and other types and numbers of service components could be used, such as WOM, LTM, ASM, a processor, an ASIC/FPGA or any other hardware component. As explained herein, each of these service components can compute its own service specific score in a component specific fashion, although other arrangements could be used such as having the traffic management device 12 programmed with instructions to determine a score for each service component.

In this particular example, the advertised score or global traffic management score (gtm_score) ranges from 0 representing no capacity to 100 representing full capacity, although other ranges and types of scoring or other indicators to identify available capacity could be used. With this technology, the advertised score, which represents available capacity for load balancing, takes into account multiple layered inner virtual services because a self score calculated based on the front virtual service alone would not provide the correct available capacity.

Referring to FIGS. 1-5, in step 100, the traffic management device 12 obtains a request for the advertised score for a front virtual service (FVS1) for load balancing, although the request could be for other types and numbers of scores and other data. In response to this received request, the traffic management device 12 obtains the advertised score for the front virtual service (FVS1) and for the next layer of inner virtual services 1 and 2 (IVS1 and IVS2) from a stored table illustrated in FIG. 5, although the advertised score can be obtained from other sources in other manners.

In step 102, the traffic management device 12 determines whether a first set period of time starting from any of the obtained time stamps for the requested advertised scores for the front virtual service (FVS1) and for the inner virtual services 1 and 2 (IVS1 and IVS2) from table 5 in memory in the traffic management device 12 has expired. In this particular example, the table illustrated in FIG. 5 includes the recorded time stamp comprising the time and date when each of the advertised scores was last determined by the traffic management device 12 for the front virtual service (FVS1) and for the inner virtual services 1 and 2 (IVS1 and IVS2). This first set time period can be adjusted by the traffic management device 12 as needed. If in step 102, the traffic management device 12 determines the first set time period from the time stamp for any of the requested advertised scores for the front virtual service (FVS1) and the inner virtual services 1 and 2 (IVS1 and IVS2) has expired based, then the Yes branch is taken to step 104, although other manners for triggering this path can be used.

Figure 3:
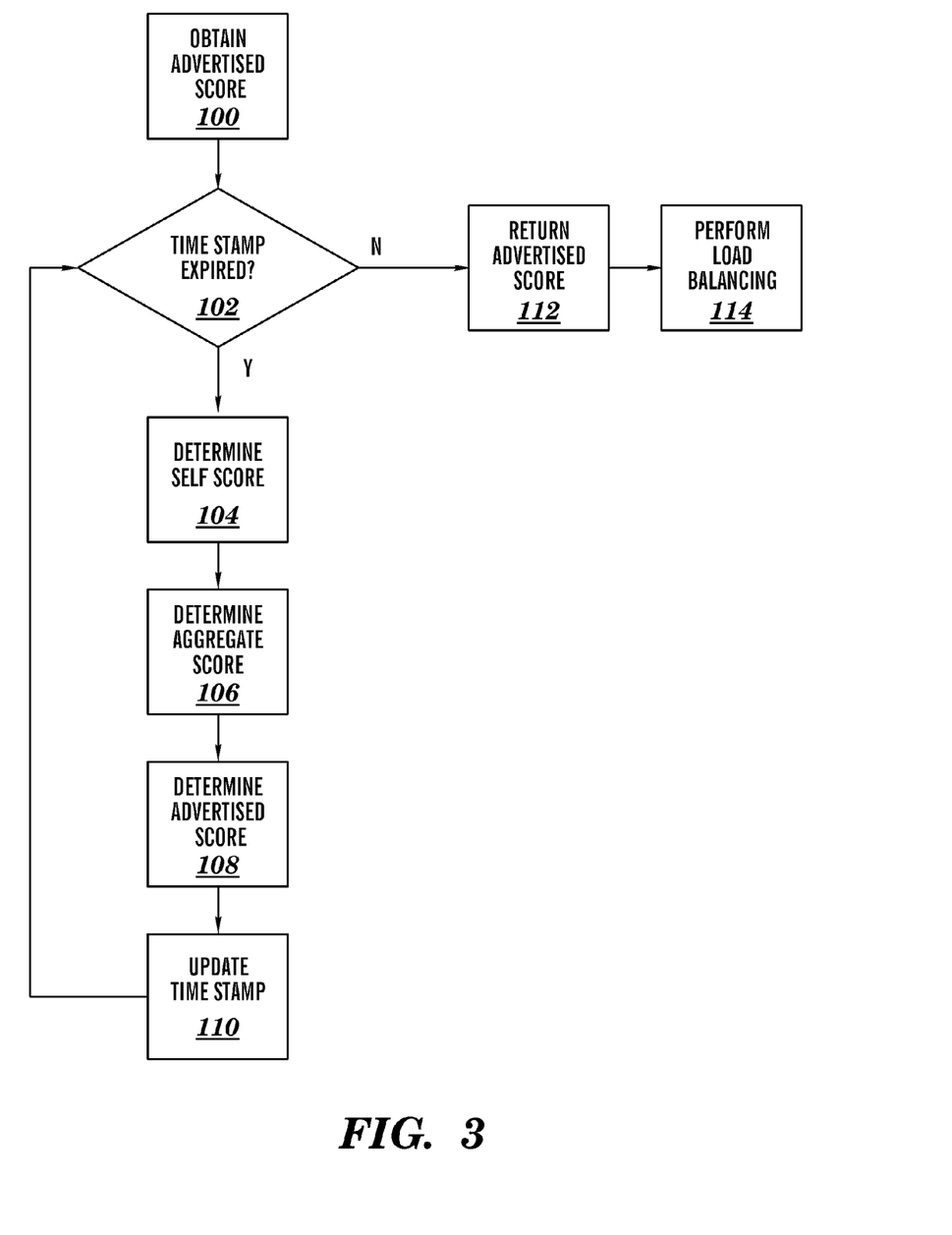
FIG. 3 is a flow chart of an exemplary method for managing traffic when multiple services are being provided.
Figure 4:
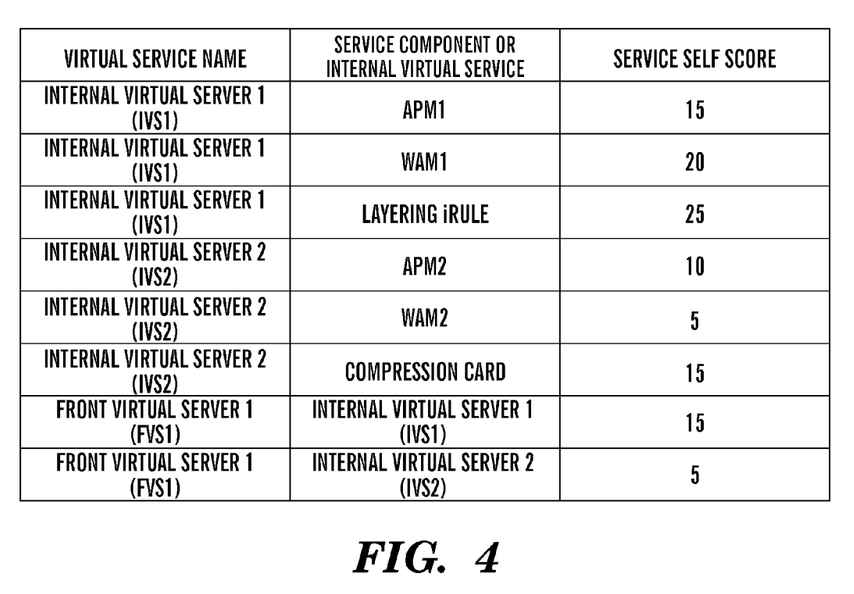
FIG. 4 is an exemplary of virtual service names, service component or inner virtual service names, and component or internal aggregate scores.

In step 104, the traffic management device 12 determines the self score for each of the front virtual service (FVS1) and the inner virtual services 1 and 2 (IVS1 and IVS2) based on the minimum self score for each of the inner virtual services and/or service components respectively coupled to each of the front virtual service (FVS1), the inner virtual service 1 (IVS1), and the inner virtual service 2 (IVS2).

In this particular example, the inner virtual service 1 (IVS1) is coupled to three service components or modules (APM1, WAM1, and a layering iRule) which each have their own criteria and mechanism to set their own service self score, although other types and numbers of service components or inner virtual services and other manners for determining the service self scores could be used. Similarly, the inner virtual service IVS2 is coupled to three service components or modules (APM2, WAM2, and a compression card) which also each have their own criteria and mechanism to set their own service self score, although again other types and numbers of service components or inner virtual services and other manners for determining the service self scores could be used. For example, the APM1 and APM2 service components each could use the active user sessions count to determine their service self score while the WAM1 and WAM2 service components uses the current transactions count to determine their service self score. The table shown in FIG. 4 and stored in memory in the traffic management device 12 provides examples of service score values for each of these service components.

Next, the inner virtual service 1 (IVS1) selects the minimum value from the service self scores for the APM1, WAM1, and a layering iRule as the self score for the inner virtual service 1 (IVS1), although other manners for obtaining the self score for the inner virtual service 1 (IVS1), such as taking the average of the service self scores could be used. In this example, the minimum value is the service self score "15" for the APM1 as shown in the table in FIG. 4 which is selected by the traffic management device 12 as the self score for the inner virtual service 1 (IVS1). Similarly, the inner virtual service 2 (IVS2) selects the minimum value from the service self scores for the APM2, WAM2, and the compression card service components as the self score for the inner virtual service 2 (IVS2), although again other manners for obtaining the service self score for the inner virtual service 1 (IVS1), such as taking the average of the self scores could be used. Additionally in this example, the minimum value is the service self score "5" for the WAM2 as shown in the table in FIG. 4 which is selected by the traffic management device 12 as the self score of the inner virtual service 2 (IVS2).

Next, the front virtual service (FVS1) is coupled to the layer below comprising inner virtual service 1 (IVS1) and the inner virtual service 2 (IVS2), although the front virtual service (FVS1) could be coupled to other types and numbers of inner virtual services and/or service components. In this example, the front virtual service (FSV1) selects the minimum value of the self scores for the inner virtual service 1 (IVS1) and the inner virtual service 2 (IVS2) as its self score, although other manners for obtaining the self score of the front virtual service (FSV1) can be used, such as taking an average of the self scores of the inner virtual service 1 (IVS1) and the inner virtual service 2 (IVS2). In this example, the minimum value is the self score "5" for the inner virtual service (ISV2) in the table in FIG. 4 which is selected by the traffic management device 12 as the self score of the front virtual service (FVS1). In this example, the traffic management device 12 also populates the self score column of the table shown in FIG. 5 with these obtained self scores for the inner virtual service (ISV1), inner virtual service (ISV2), or the front virtual service (FSV1).

In step 106, the traffic management device 12 determines an aggregate score for each of the inner virtual service (ISV1), the inner virtual service (ISV2), and the front virtual service (FSV1) based on the determined self score and number of active connections or flows to each service component and/or inner virtual service coupled to the inner virtual service (ISV1), the inner virtual service (ISV2), and the front virtual service (FSV1), respectively. More specifically, an example of determining the aggregate or layered score for each of the inner virtual service (ISV1), the inner virtual service (ISV2), and the front virtual service (FSV1) with the traffic management device 12 is set forth below.

In this example, the aggregate or layered score of the inner virtual service (ISV1), is calculated by the traffic management device 12 as follows:

$$((\text{Self Score for } APM1 * C3) + (\text{Self Score for } WAM1 * C4) + (\text{Self Score for Layering } iRule * C5))/(C3 + C4 + C5)$$

Additionally, the aggregate or layered score of the inner virtual service (ISV2), is calculated by the traffic management device 12 as follows:

$$((\text{Self Score for } APM2 * C6) + (\text{Self Score for } WAM2 * C7) + (\text{Self Score for Layering } iRule * C8))/(C6 + C7 + C8).$$

Further, the aggregate or layered score of the front virtual service (FSV1), is calculated by the traffic management device 12 as follows:

$$((\text{Self Score for } IVS1 * C1) + (\text{Self Score for } IVS2 * C2))/(C1 + C2).$$

Figure 5:
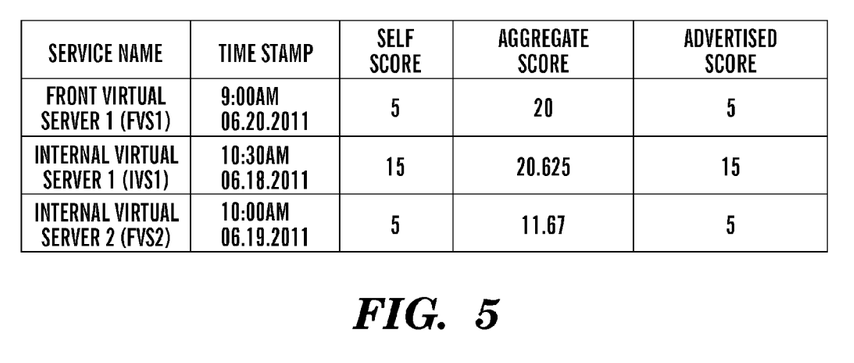
FIG. 5 is an exemplary table of service names, time stamps, self scores, aggregate scores and advertised scores.

By way of example only, using the numbers in the table illustrated in FIG. 5, the traffic management device 12 would determine the aggregate score for the inner virtual service 1 (IVS1) to be "20.625", the aggregate score for the inner virtual service 2 (IVS2) to be "11.67" and the aggregate score for the front virtual service (FVS1) to be "20". The determined aggregate scores along with the time and date when they were determined, i.e. the time stamps, are recorded and stored in the table shown in FIG. 5 in memory in the traffic management device 12, although other manners and locations for storing this data can be used.

As illustrated in the example above, the service components or layered inner virtual services with a high number of connections/flows to either an inner virtual service or the front virtual service (FVS1) at the next level contribute more to the weighted average. This approach also can be used recursively to calculate the aggregate score of additional inner layered virtual services (not shown). Further, checks may be added in this implementation in the traffic management device 12 to prevent loops.

This example also assumes the relationship between the front virtual FV1 and the inner layered virtuals (IVS1 and IVS2) and the relationship between the inner layered virtuals (IVS1 and IVS2) and the service components as shown in FIG. 2 is dynamically determined by the traffic management device 12. By way of example only, in the case of APM, the traffic management device 12 can use the connectivity profile setting in the front virtual service (FVS1) to detect the layered inner virtual services 1 and 2 (IVS1 and IVS2) using the tunnel and the VLAN settings.

In step 108, the traffic management device 12 determines the advertised score for the front virtual service (FVS1) by selecting the minimum of the aggregate scores for the inner virtual services 1 and 2 (IVS1 and IVS2), although other manners for determining an advertised score can be used, such as taking the average of the aggregate scores for the inner virtual services 1 and 2 (IVS1 and IVS2). In this particular example using the values in the table illustrated in FIG. 5, the advertised score for the front virtual service (FVS1) is determined by the traffic management device 12 to be "5" by selecting the minimum value of the aggregate scores for the inner virtual services 1 and 2 (IVS1 and IVS2) and the self score for the front virtual service, which was determined as described and illustrated earlier with reference to step 104.

In step 110, the traffic management device 12 updates the time stamp for the obtained advertised score for the front virtual service (FVS1) and for the obtained advertised score for the inner virtual services (ISV1 and ISV2) which are stored in the table shown in FIG. 5 in memory in the traffic management device 12.

Following step 110, the process again returns to step 102 as described earlier. If in step 102, the traffic management device 12 determines the time stamps for the requested advertised scores for the front virtual service (FSV1) and for the inner virtual services 1 and 2 (IVS1 and IVS2) have not expired, then the No branch is taken to step 112, although other manners for triggering the No branch can be used, such as just the time stamps for the requested advertised scores for the front virtual service (FSV1) still being within the set time period and thus valid.

In step 112, the traffic management device 12 provides the requested advertised score in response to the initial received request to the load balancing module (not shown) in the traffic management device 12, although the requested advertised scored can be provided to other modules and applications. In step 114, the traffic management device 12 utilizes the advertised score with the load balancing module to make more accurate load balancing decisions because the load on the layered inner virtual services is taken into account.

Accordingly, as illustrated and described herein this technology provides a number of advantages including providing more effective methods and devices to manage traffic when multiple services are being provided. With this technology, a score representative of a current load on a system with multiple layered virtual systems can be determined and provided for load balancing decisions.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for managing traffic in a multi-service environment, the method comprising:
   determining, by a traffic management computing device, for a front virtual service coupled to a plurality of inner virtual services, a front virtual service self score based on a minimum one of a plurality of inner virtual service self scores obtained from the plurality of inner virtual services;
   determining, by the traffic management computing device, an aggregate score for the front virtual service based on an average of advertised scores obtained from each of a plurality of the inner virtual services, the average of advertised scores determined based on a respective weighting factor applied to each of the obtained advertised scores, wherein each of the weighting factors is based on a number of connections between a respective one of the inner virtual services and the front virtual service;
   obtaining, by the traffic management computing device, an advertised score for the front virtual service based on at least one of the determined front virtual service self score for the front virtual service or the determined aggregate score for the front virtual service;
   recording, by the traffic management computing device, a timestamp when the advertised score for the front virtual service is obtained; and
   load balancing, by the traffic management computing device, incoming network traffic flows comprising one or more packets, based on the obtained advertised score for the front virtual service when a predetermined time period starting from when the timestamp was recorded has not elapsed, wherein the load balancing further comprises transmitting the one or more packets.

2. The method as set forth in claim 1, wherein the determining with the traffic management device the aggregate score for the front virtual service further comprises:
   multiplying, by the traffic management computing device, the one of a plurality of inner virtual service self scores for each of the inner virtual services with the corresponding number of connections between the front virtual service and that one of the inner virtual services;
   summing, by the traffic management device, each of the multiplied one of a plurality of inner virtual service self scores together; and
   dividing, by the traffic management device, the summed multiplied one of a plurality of inner virtual service self scores by a total number of the connections between each of the inner virtual services and the front virtual service to obtain the aggregate score for the front virtual service.

3. The method as set forth in claim 1, wherein the advertised score for the front virtual service is obtained based on a minimum of the determined front virtual service self score for the front virtual service and the determined aggregate score for the front virtual service.

4. The method as set forth in claim 1, wherein the advertised score for the front virtual service is obtained based on an average of the determined front virtual service self score for the front virtual service and the determined aggregate score for the front virtual service.

5. The method as set forth in claim 1, further comprising:
recording, by the traffic management computing device, a score timestamp when the advertised score for the front virtual service is determined.

6. The method as set forth in claim 5, further comprising:
determining, by the traffic management computing device, when the score timestamp has expired before determining the advertised score for the front virtual service; and
updating, by the traffic management computing device, at least one of the determined front virtual service self score for the front virtual service or the determined aggregate score for the front virtual service when the score timestamp is determined to be expired.

7. The method as set forth in claim 1, wherein the front virtual service self score comprises an available capacity of the plurality of inner virtual services.

8. A non-transitory computer readable medium having stored thereon instructions for managing traffic in a multi-service environment comprising machine executable code which when executed by at least one processor, causes the processor to perform steps comprising:
determining for a front virtual service coupled to a plurality of inner virtual services, a front virtual service self score based on a minimum one of a plurality of inner virtual service self scores obtained from the plurality of inner virtual services;
determining an aggregate score for the front virtual service based on an average of advertised scores obtained from each of a plurality of the inner virtual services, the average of advertised scores determined based on a respective weighting factor applied to each of the obtained advertised scores, wherein each of the weighting factors is based on a number of connections between a respective one of the inner virtual services and the front virtual service;
obtaining an advertised score for the front virtual service based on at least one of the determined front virtual service self score for the front virtual service or the determined aggregate score for the front virtual service;
recording a timestamp when the advertised score for the front virtual service is obtained; and
load balancing incoming network traffic flows comprising one or more packets, based on the obtained advertised score for the front virtual service when a predetermined time period starting from when the timestamp was recorded has not elapsed, wherein the load balancing further comprises transmitting the one or more packets.

9. The medium as set forth in claim 8, wherein the determining the aggregate score for the front virtual service further comprises:
multiplying the one of a plurality of inner virtual service self scores for each of the inner virtual services with the corresponding number of connections between the front virtual service and that one of the inner virtual services;
summing each of the multiplied one of a plurality of inner virtual service self scores together; and
dividing the summed multiplied one of a plurality of inner virtual service self scores by a total number of the connections between each of the inner virtual services and the front virtual service to obtain the aggregate score for the front virtual service.

10. The medium as set forth in claim 8, wherein the advertised score for the front virtual service is obtained based on a minimum of the determined front virtual service self score for the front virtual service and the determined aggregate score for the front virtual service.

11. The medium as set forth in claim 8, wherein the advertised score for the front virtual service is obtained based on an average of the determined front virtual service self score for the front virtual service and the determined aggregate score for the front virtual service.

12. The medium as set forth in claim 8, further having stored thereon instructions further comprising machine executable code which when executed by the at least one processor, causes the processor to perform steps further comprising recording a score timestamp when the advertised score for the front virtual service is determined.

13. The medium as set forth in claim 12 further comprising:
determining when the score timestamp has expired before determining the advertised score for the front virtual service; and
updating at least one of the determined front virtual service self score for the front virtual service or the determined aggregate score for the front virtual service when the score timestamp is determined to be expired.

14. The medium as set forth in claim 8, wherein the front virtual service self score comprises an available capacity of the plurality of inner virtual services.

15. A traffic management device comprising:
one or more processors; and
a memory coupled to the one or more processors, the one or more processors configured to be capable of executing programmed instructions comprising and stored in the memory to:
determine for a front virtual service which is coupled to a plurality of inner virtual services, a front virtual service self score based on a minimum one of a plurality of inner virtual service self scores obtained from the plurality of inner virtual services;
determine an aggregate score for the front virtual service based on an average of advertised scores obtained from each of a plurality of the inner virtual services, the average of advertised scores determined based on a respective weighting factor applied to each of the obtained advertised scores, wherein each of the weighting factors is based on a number of connections between a respective one of the inner virtual services and the front virtual service;
obtain an advertised score for the front virtual service based on at least one of the determined front virtual service self score for the front virtual service or the determined aggregate score for the front virtual service;
record a timestamp when the advertised score for the front virtual service is obtained; and
load balance incoming network traffic flows comprising one or more packets, based on the obtained advertised score for the front virtual service when a predetermined time period starting from when the timestamp was recorded has not elapsed, wherein the load balancing further comprises transmitting the one or more packets.

16. The device as set forth in claim 15, wherein the processor is further configured to be capable of executing programmed instructions to determine the aggregate score for the front virtual service comprising and stored in the memory to:
multiply the one of a plurality of inner virtual service self scores for each of the inner virtual services with the corresponding number of connections between the front virtual service and that one of the inner virtual services;

sum each of the multiplied one of a plurality of inner virtual service self scores together; and divide the summed multiplied one of a plurality of inner virtual service self scores by a total number of the connections between each of the one or more inner virtual services and the front virtual service to obtain the aggregate score for the front virtual service.

17. The device as set forth in claim 15, wherein the advertised score for the front virtual service is obtained based on a minimum of the determined front virtual service self score for the front virtual service and the determined aggregate score for the front virtual service.

18. The device as set forth in claim 15, wherein the advertised score for the front virtual service is obtained based on an average of the determined front virtual service self score for the front virtual service and the determined aggregate score for the front virtual service.

19. The device as set forth in claim 15, wherein the one or more processors is further configured to be capable of executing programmed instructions comprising and stored in the memory to record a score timestamp when the advertised score for the front virtual service is determined.

20. The device as set forth in claim 19, wherein the one or more processors is further configured to be capable of executing programmed instructions comprising and stored in the memory to:
  determine when the score timestamp has expired before determining the advertised score for the front virtual service; and
  update at least one of the determined self score for the front virtual service or the determined aggregate score for the front virtual service when the score timestamp is determined to be expired.

21. The device as set forth in claim 15, wherein the front virtual service self score comprises an available capacity of the plurality of inner virtual services,
  obtaining a self score for each of the inner virtual services; and
  determining the self score for the front virtual service based on at least one of an average or a minimum of the obtained self scores for each of the inner virtual services,
  determining whether the timestamp has expired before determining the advertised score for the front virtual service; and
  updating at least one of the determined self score for the front virtual service or the determined aggregate score for the front virtual service when the timestamp is determined to be expired.

* * * * *